US012793112B2

(12) United States Patent
Unnikrishnan et al.

(10) Patent No.: US 12,793,112 B2
(45) Date of Patent: Nov. 10, 2026

(54) AUTOMATICALLY CATALOGUING ITEM COMPATIBILITY FEATURES

(71) Applicant: ADOBE INC., San Jose, CA (US)

(72) Inventors: Soumya Unnikrishnan, Austin, TX (US); Michele Saad, Austin, TX (US); Saina Lajevardi, Austin, TX (US)

(73) Assignee: ADOBE INC., San Jose, CA (US)

( * ) Notice: Subject to any disclaimer, the term of this patent is extended or adjusted under 35 U.S.C. 154(b) by 206 days.

(21) Appl. No.: 18/162,945

(22) Filed: Feb. 1, 2023

(65) Prior Publication Data

US 2024/0257199 A1 Aug. 1, 2024

(51) Int. Cl.
*G06Q 30/0601* (2023.01)
*G06Q 30/0202* (2023.01)

(52) U.S. Cl.
CPC ..... *G06Q 30/0621* (2013.01); *G06Q 30/0202* (2013.01); *G06Q 30/0625* (2013.01)

(58) Field of Classification Search
None
See application file for complete search history.

(56) References Cited

U.S. PATENT DOCUMENTS

| | | | | |
|---|---|---|---|---|
| 10,133,958 | B2 * | 11/2018 | Kale | G06N 7/01 |
| 11,861,674 | B1 * | 1/2024 | Huang | G06V 40/16 |
| 2021/0089598 | A1 * | 3/2021 | Jeong | G06F 16/9024 |
| 2023/0139720 | A1 * | 5/2023 | Sortur | G06F 18/24323 705/26.64 |

FOREIGN PATENT DOCUMENTS

| | | | | |
|---|---|---|---|---|
| EP | 3506133 | A1 * | 7/2019 | G06F 30/18 |

OTHER PUBLICATIONS

Song, "Building and Querying an Enterprise Knowledge Graph," in IEEE Transactions on Services Computing, vol. 12, No. 3, pp. 356-369, May 1-Jun. 2019, doi: 10.1109/TSC.2017.2711600 (Year: 2019).*

1Nguyen, et al. "Compatible Item Recommendation", Texas A&M University, Undergraduate Research Scholar, May 2018, 28 pages.

* cited by examiner

*Primary Examiner* — Mehmet Yesildag
*Assistant Examiner* — Michael Borowski
(74) *Attorney, Agent, or Firm* — F. CHAU & ASSOCIATES, LLC

(57) ABSTRACT

Systems and methods for inferring compatibility relationships are described. Embodiments of the present disclosure identify user interaction history including an interaction between a user and a first product, wherein the first product comprises an attribute that is compatible with a subset of available products; query a database that includes the available products to identify a second product from the subset of available products based on the attribute, wherein the second product is identified based on a knowledge graph that includes a first node representing the first product and a second node representing the second product; and provide a customized user experience for the user that indicates the second product and the attribute.

16 Claims, 10 Drawing Sheets

AUTOMATICALLY CATALOGUING ITEM COMPATIBILITY FEATURES

BACKGROUND

The following relates generally to data processing, and more specifically to inferring compatibility relationships between items. Shoppers consider item compatibility when purchasing an item for use with another item. For instance, some car seats may be compatible with one stroller model frame but not with another frame. Similarly, a phone case may be compatible with a specific phone model but not with another model that may be of a different size. A screw of a particular diameter may be needed for a specific bolt.

Searching for compatible parts and items may be time consuming, and can lead to erroneous purchases, especially when a certain level of expertise is required to understand technical attributes related to compatibility. To address this, merchants may create compatibility databases for a merchant platform to use. However, in many cases, these compatibility databases are not frequently updated to include new items, or to address incorrect information. This can lead to missed sales, an increased rate of returns for the merchant, or a lack of visibility for listed products. There is a need in the art for systems and methods to automatically determine compatibility between items without being fully reliant on manually curated databases.

SUMMARY

The present disclosure describes systems and methods for automatically inferring compatibility between items. Embodiments extract information from structured data, such as compatibility databases, and further perform natural language processing on unstructured data to extract additional information. Information from the structured and unstructured data is used to create a knowledge graph that describes the relationships between items and other items, as well as between items and attributes. In some examples, an embedding component generates an embedding for each item and attribute, where the embedding encodes the relationships.

A prediction component may decode the embeddings to determine compatibility information. For example, a user may identify a first item, and the prediction component may find a corresponding embedding for the first item, decode it, and identify compatible items. In some examples, when there is no corresponding structured information about the compatibility, the compatible items may be ranked according to a compatibility score, and only items which surpass a threshold compatibility score may be recommended.

The embeddings can further be used by a generative model to generate a title and description for new items. For example, upon adding a new item to a merchant platform, a merchandizer may use the system to generate additional description or title detail about the item. The merchandizer may also use the system to create suggested item bundles that include compatible items.

An item compatibility system is configured to automatically identify compatibility between items and provide a customized user experience. The item compatibility system may include an item compatibility apparatus, a database, a network, and a user.

The item compatibility apparatus may be implemented in hardware that is local or remote with respect to the user, and can generate information to provide the customized user experience. Embodiments of the item compatibility apparatus include several components which are configured to extract information from structured and unstructured data, and generate item listings and identify compatible items. In some examples, one or more of the components implement trainable machine learning models. The machine learning models may include parameters that are optimized during a training phase.

A method, apparatus, non-transitory computer readable medium, and system for inferring compatibility relationships are described. One or more aspects of the method, apparatus, non-transitory computer readable medium, and system include identifying user interaction history including an interaction between a user and a first product, wherein the first product comprises an attribute that is compatible with a subset of available products; querying a database that includes the available products to identify a second product from the subset of available products based on the attribute, wherein the second product is identified based on a knowledge graph that includes a first node representing the first product and a second node representing the second product; and providing a customized user experience for the user that indicates the second product and the attribute.

A method, apparatus, non-transitory computer readable medium, and system for inferring compatibility relationships are described. One or more aspects of the method, apparatus, non-transitory computer readable medium, and system include receiving unstructured product data about a first product; performing natural language processing on the unstructured product data to identify the first product and an attribute that indicates compatibility of the first product with a subset of available products; generating a knowledge graph that represents the first product and the attribute; and generating listing content for the first product based on the knowledge graph, wherein the listing content indicates compatibility of the first product with the subset of available products based on the attribute.

An apparatus, system, and method for inferring compatibility relationships are described. One or more aspects of the apparatus, system, and method include a processor; a memory including instructions executable by the processor; a natural language processing component configured to perform natural language processing on unstructured product data to identify a first product and an attribute that indicates compatibility of the first product with a subset of available products; a knowledge graph component configured to generate a knowledge graph that represents the first product and the attribute; and an embedding component configured to generate a first vector representation of the first product.

DETAILED DESCRIPTION

Figure 1:
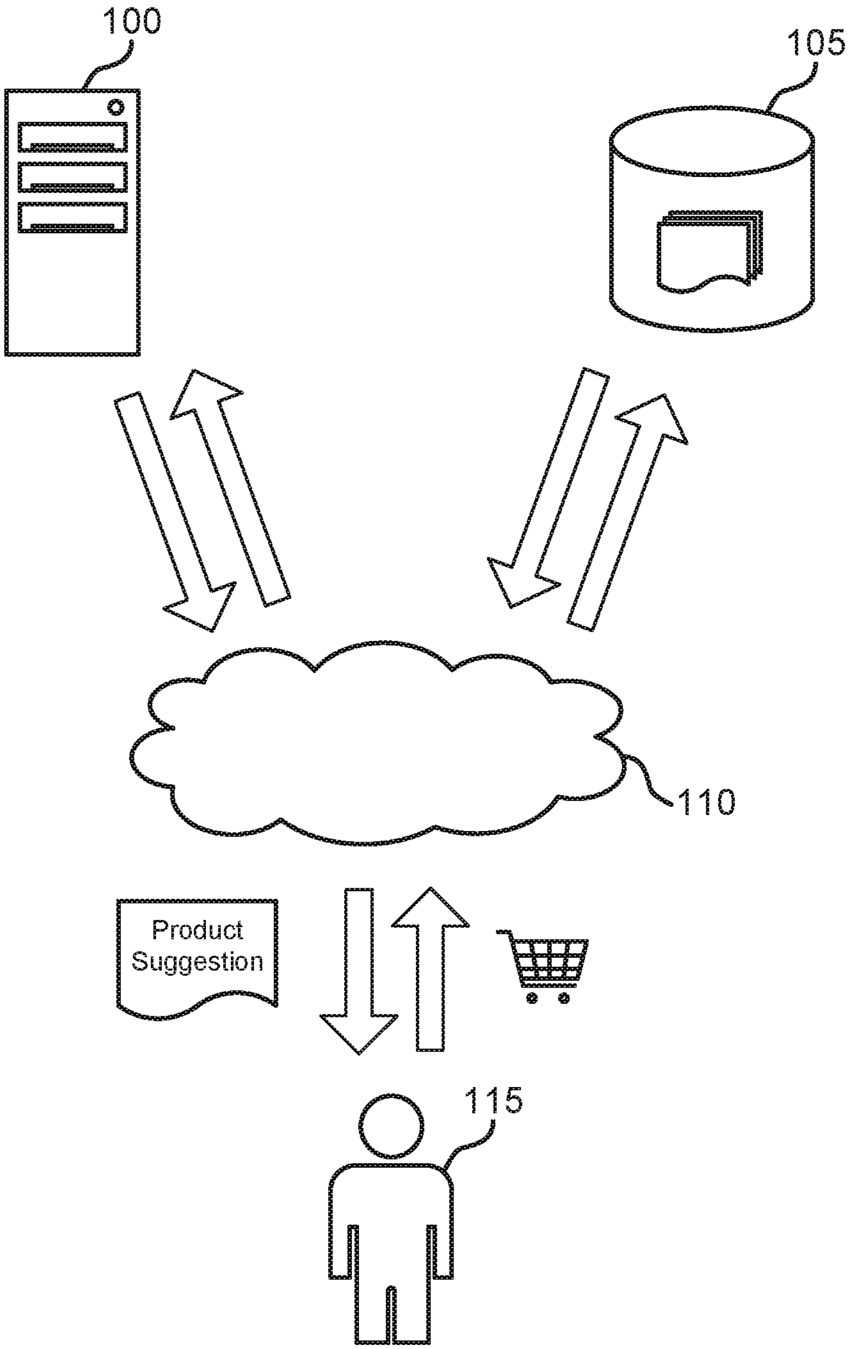
FIG. 1 shows an example of an item compatibility system according to aspects of the present disclosure.

According to some aspects, an item compatibility system includes a natural language processing (NLP) component, a knowledge graph component, and an embedding component. In some aspects, the NLP component processes information from product listings on a merchant website and extracts information therefrom. The knowledge graph component then updates a knowledge graph including nodes that represent products and attributes. The embedding component generates embeddings for each product, which can then be processed to identify compatible products that include shared attributes.

In some aspects, the system identifies a user interaction history including an interaction between a user and a first product. In some aspects, the first product includes an attribute that is compatible with subsets of available products. Then, the system queries a database including the available products to identify a second product from the subset of available products based on the attribute. In some aspects, the second product is identified based on a knowledge graph created by the knowledge component that includes a first node that represents the first product and a second node that represents the second product. In some aspects, the second product is identified by processing a vector representation of the first product that was created by the embedding component. Through the creation and maintenance of the knowledge graph, and through the automatic processing of additional information using the NLP component, the item compatibility system is able to generate additional compatibility information that can be missed by conventional systems.

Determining compatibility between items is useful for both shoppers and merchants. Shoppers consider item compatibility when purchasing an item for use with another item. Knowledge of a shared attribute between the compatible items allows the shopper to make informed decisions between the compatible items. Merchants use item compatibility to generate better listings for their items, so that shoppers might be directed towards their items as viable options.

Conventional item recommendation systems recommend products based on users and items. For example, if a user purchases a product, then the recommendation system may recommend similar products based on previous purchases of the user. Some implementations of recommendation systems analyze a product database and map product relationships to create a model which identifies compatible items. However, such recommendation systems include features that are shopper facing, i.e., the compatibility features are not merchant or back-office facing. Additionally, such systems are not able to infer attributes related to compatibility that provides for shoppers to search and filter by the attributes. Some systems may infer whether items are compatible or not compatible without considering an attribute on which the compatibility is based on.

Most existing systems for cataloguing item compatibility rely on maintaining structured databases for each item or for a merchant platform. For example, the database may be curated by domain experts (i.e., merchants of the items). However, merchants can differ in their practices, and some may not provide structured compatibility information for their products. For example, some merchants may only include other compatible items in their title or description. This unstructured data may not be suitable for use by the merchant platform to recommend other items, as many platforms use only the structured databases. Furthermore, some merchants may list some items as compatible with their item, but the listings may end up being inaccurate. These inaccuracies are frequently pointed out in reviews of the product, for example.

Some systems attempt to infer compatibility between items. For example, some systems utilize natural language processing to match entities in the titles and descriptions of items to each other. While these systems are capable of finding compatible item pairs, they do not identify the shared attribute between items. Furthermore, these systems lack the ability to automatically generate or augment item descriptions and titles in their listing, partly due to not identifying the attribute. As a result, these systems are unable to provide use to merchants who wish to create and augment their listings, and are instead only shopper facing.

Embodiments of the present disclosure include a shopper facing feature and a back-office or merchant facing feature configured to address compatibility of items sold. In some examples, the shopper front can include a feature that alerts shoppers to the compatibility issue when browsing items that require compatibility with another item. For example, some embodiments provide alerts to shoppers so that compatibility issues are visible and salient.

In an example use case, the system provides a shopper front which displays a list of compatible items and provides for filtering and browsing by compatible items. The compatible items may be ranked according to a compatibility score determined by, for example, relationships embedded within a vector representation of an item.

In an example use case, the system provides a merchant front which can automatically infer a compatibility graph (or matrix in a simplified instance) and displays the graph to the merchandizer for approval and edits. In some cases, the graph may be provided to a merchant in a graphical user interface, and any edits or approvals may be added to a structured database.

As used herein, "user interaction history" refers to a body of data that includes one or more users' interactions with one or more product listings over time. A user interaction history can include a user's past purchases, current shopping cart information, past "likes" or visits to item listings, and the like.

As used herein, "attributes" refers to properties about an item. Attributes include properties that can enable or preclude compatibility of the item with other items. An example attribute could be "size 14.18x", which can represent a phone's dimensions with sufficient specificity to indicate compatibility with other items, such as phone cases. In this example, the attribute is "size 14.18x", the attribute type is size, a first item may be "Phone XYZ", a second item may be "Case—Purple", and a relationship between the first item and the second item may be "has_size". The attribute, the first item, and the second item, and the relationship may be encoded into a knowledge graph.

A "knowledge graph" includes information about items and attributes. The items and attributes may be represented as nodes in the graph, and edges between the nodes can represent a relationship between each node. For example, an edge between a product and an attribute can indicate that the product has the attribute, and an edge between a product and a product can indicate that the two products are compatible or predicted to be compatible with each other. In some examples, the knowledge graph is represented by one or more matrices.

A "node" describes an object within a data structure or schema that includes data, as well as connections to one or more other nodes. The data can vary according to the schema, and can include several properties about an item represented by the node.

As used herein, "available products" refers to products listed on a platform that are currently available. Items can be referred to synonymously as "products". In some cases, an NLP component or a knowledge graph component identifies whether one or more products are available for shipping and purchase before adding them to a knowledge graph. In some cases, the system adds the products to the knowledge graph, and checks for item availability at inference time, i.e., at the time of providing the customized user interface to a user.

As used herein, a "database" refers to any memory storage system configured to store product listings, knowledge graphs, embeddings, and other data used in the operations described herein. For example, the database can include memory that is local to an item compatibility apparatus, as well as memory that is remote with respect to the item compatibility apparatus. The remote database may be operated by a server, for example.

As used herein, a "customized user experience" for a shopper can include customized product (i.e., item) recommendations, product bundle recommendations, warnings about incompatible products, and customized product listing content. A customized user experience for a merchandizer can include an interface to edit/approve product listings, for editing compatibility information, for generating product listings, and the like.

Embodiments infer items that are compatible and the compatible attributes to provide shoppers and merchants useful features. In some cases, the item compatibility apparatus can infer hero items and complementary items. For example, a phone can be considered a hero item and a phone case can be considered a complementary item. Further, embodiments identify and label the attributes that influence compatibility. For example, if a phone case is compatible with a phone, embodiments may track attributes including size, configuration, front or back camera shape, and the like.

Accordingly, a shopper can filter, search, and browse by compatibility attributes. The item compatibility apparatus can guide the user to appropriate items when searching or browsing for items to purchase. For example, the item compatibility apparatus can provide information to help prevent the shopper making an erroneous purchase due to incompatibility. Additionally, the merchants with the appropriate items get more visibility.

In some aspects, a compatibility function can be modeled for attributes of items in the same parent category, but which have a different sub-category node. For example, an iPhone 13 may appear under the subcategory of iPhones and an iPhone 13 case may appear under the same root node of electronics but in a different category sub-node of accessories. In some examples, products that share attributes indicating compatibility and that have a significant price difference can be inferred as a compatible product pair, such as a phone and a phone case.

An item compatibility system is described with reference to FIGS. 1-4. Methods for automatically identifying and cataloguing compatible items, as well as presenting them to a user, are described with reference to FIGS. 5-7. Methods for generating item listings, including descriptions and titles, are described with reference to FIGS. 8-10.

Item Compatibility System

An apparatus for inferring compatibility relationships is described. One or more aspects of the apparatus include a processor; a memory including instructions executable by the processor; a natural language processing component configured to perform natural language processing on unstructured product data to identify a first product and an attribute that indicates compatibility of the first product with a subset of available products; a knowledge graph component configured to generate a knowledge graph that represents the first product and the attribute; and an embedding component configured to generate a first vector representation of the first product.

Some examples of the apparatus, system, and method further include a prediction component configured to identify a second product that is compatible with the first product. Some further include a generative model configured to generate a product description for the first product, wherein the product description includes inferred compatibility information. In some aspects, the natural language processing component comprises a named entity recognition model. In some aspects, the embedding component comprises a graph neural network.

FIG. 1 shows an example of an item compatibility system according to aspects of the present disclosure. The example shown includes item compatibility apparatus 100, database 105, network 110, and user 115.

In an example, user 115 provides a user interaction history such as a current shopping cart or purchase history to item compatibility apparatus 100. For example, user 115 may interact with a user interface, such as a web application, to generate the user interaction history and provide it to item compatibility apparatus 100. In some examples, item compatibility apparatus 100 retrieves structured and unstructured product data for one or more products based on the user interaction history. Item compatibility apparatus 100 may then suggest compatible products to user 115.

According to some aspects, item compatibility apparatus 100 identifies user interaction history including an interaction between user 115 and a first product, where the first product includes an attribute that is compatible with a subset of available products. Item compatibility apparatus 100 is an example of, or includes aspects of, the corresponding element described with reference to FIG. 2.

Item compatibility apparatus 100 may be implemented hardware that is local or remote with respect to the user, and is configured to receive structured and unstructured data from user 115 or database 105 through network 110. In some embodiments, item compatibility apparatus 100 or one or more components thereof is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Item compatibility apparatus 100 may store model parameters, products, or other information used to provide a customized user experience in a memory, or may store the information on database 105. A database is an organized collection of data. For example, a database stores data in a specified format known as a schema. A database may be structured as a single database, a distributed database, multiple distributed databases, or an emergency backup database. In some cases, a database controller may manage data storage and processing in database 105. In some cases, user 115 interacts with the database controller. In other cases, the database controller may operate automatically without user interaction.

Network 110 facilitates the transfer of information between item compatibility apparatus 100, database 105, and user 115. Network 110 can be referred to as a "cloud." A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

Figure 2:
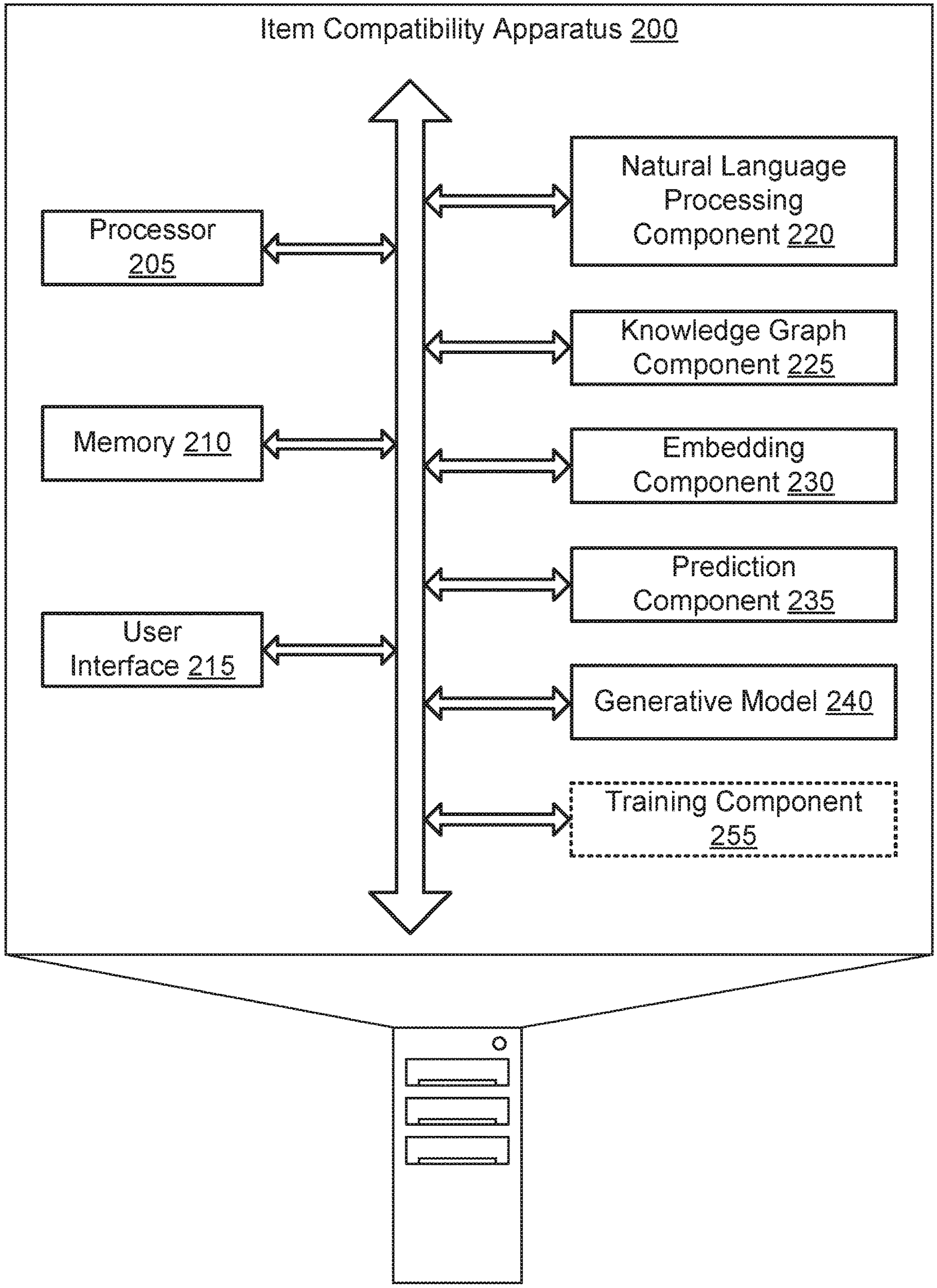
FIG. 2 shows an example of an item compatibility apparatus according to aspects of the present disclosure.

FIG. 2 shows an example of an item compatibility apparatus 200 according to aspects of the present disclosure. The example shown includes item compatibility apparatus 200, processor 205, memory 210, user interface 215, natural language processing component 220, knowledge graph component 225, embedding component 230, prediction component 235, generative model 240, and training component 245. Item compatibility apparatus 200 is an example of, or includes aspects of, the corresponding item compatibility apparatus described with reference to FIG. 1.

Processor 205 executes instructions which implement the components of item compatibility apparatus 200. A processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. The memory array may be within a memory located on item compatibility apparatus 200 such as memory 210, or may be included in an external memory. In some embodiments, the memory controller is integrated into processor 205. Processor 205 is configured to execute computer-readable instructions stored in memory 210 to perform various functions. In some embodiments, processor 205 includes special purpose components for modem processing, baseband processing, digital signal processing, or transmission processing.

Memory 210 stores instructions executable by processor 205, and may further be used to store data such as artificial neural network (ANN) parameters, encodings (e.g., vector representations of nodes, which correspond to nodes or attributes), and other information used to provide a customized user experience. Memory 210 may work with a database as described with reference to FIG. 1 to provide storage for item compatibility apparatus 200. Memory 210 includes one or more memory devices. Examples of a memory device include random access memory (RAM), read-only memory (ROM), or a hard disk. Further examples include solid state memory and a hard disk drive. In some examples, memory is used to store computer-readable, computer-executable software including instructions that, when executed, cause processor 205 to perform various functions described herein. In some cases, memory 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

User interface 215 allows a user such as a shopper or merchant to interact with item compatibility apparatus 200. In some embodiments, the user interface may include an audio device, such as an external speaker system, an external display device such as a display screen, or an input device (e.g., remote control device interfaced with user interface 215 directly or through an IO controller module). In some cases, a user interface may be a graphical user interface (GUI).

According to some aspects, user interface 215 provides a customized user experience for the user that indicates the second product and the attribute. In some examples, user interface 215 provides an alert to the user that the third product is not compatible with the first product based on the determination.

Natural language processing component 220 refers to a circuit or set of instructions configured to perform natural language processing on an input text. Natural language processing (NLP) refers to techniques for using computers to interpret or generate natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. These models can express the relative probability of multiple answers. Natural language processing component 220 may be configured to perform named entity recognition (NER) on an input text, which allows item compatibility apparatus 200 to separate items and attributes from contextual information. Natural language processing component 220 may include a trainable ANN, and may include a pre-trained model such as a pre-trained GPT-3 model or similar. In some cases, natural language processing component 220 is trained in a separate training phase by training component 255 using training data that includes ground-truth NER data and a training text.

According to some aspects, natural language processing component 220 performs natural language processing on the unstructured product data to identify the first product and an attribute that indicates compatibility of the first product with a subset of available products. In some examples, natural language processing component 220 performs, using a natural language processing component 220, natural language processing on the unstructured text to generate predicted annotations. In some aspects, the natural language processing component 220 includes a named entity recognition model. Natural language processing component 220 is an example of, or includes aspects of, the corresponding element described with reference to FIG. 3.

Natural language processing component 220, embedding component 230, prediction component 235, and generative model 240 may include an artificial neural network. An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Knowledge graph component 225 is configured to create a knowledge graph based on structured data from a compatibility database and unstructured data that has been processed by natural language processing component 220. A knowledge graph is a knowledge base that uses a graph-structured data model or topology to integrate data. The arrangement of nodes and edges within the knowledge graph may be stored in the form of one or more matrices. In some embodiments, knowledge graph component 225 initializes a knowledge graph based on structured data, and adds predicted or inferred edges based on known relationships. Knowledge graph component 225 may add, delete, or change nodes and edges after the initialization in response to structured and unstructured data. The unstructured data may include, but is not limited to, product titles, product descriptions, product reviews, FAQs, texts extracted from product images, and other data.

According to some aspects, knowledge graph component 225 generates the knowledge graph based on the natural language processing. In some examples, knowledge graph component 225 generates the first node, the second node, and an edge between the first node and the second node based on the natural language processing, where the edge indicates compatibility of the first product and the second product. In some examples, knowledge graph component 225 generates the first node, a third node representing the attribute, and an edge between the first node and the third node based on the natural language processing, where the edge indicates the first product has the attribute. Knowledge graph component 225 is an example of, or includes aspects of, the corresponding element described with reference to FIGS. 3, 7, and 10.

Embedding component 230 may include a graph neural network and an encoder. Embodiments of embedding component 230 are configured to encode nodes and attributes into vector representations based on information in the knowledge graph. The vector representations for each item, also referred to as embeddings, contain information about the items as well as their relationships to other items and attributes. The graph neural network of embedding component 230 is configured to optimize the embeddings based on information from the knowledge graph, such that the embeddings, once decoded, provide more accurate information about the items. For example, the graph neural network may adjust the embeddings so prediction component 235 infers compatibility more accurately, and so generative model 240 generates more accurate descriptions and titles about the item.

According to some aspects, embedding component 230 generates a first vector representation of the first product, where the first node corresponds to the first vector representation. In some examples, embedding component 230 generates a second vector representation of the second product, where the second node corresponds to the second vector representation. In some examples, embedding component 230 updates the first vector representation using a graph neural network based on the knowledge graph. Embedding component 230 is an example of, or includes aspects of, the corresponding element described with reference to FIGS. 3, 7, and 10.

A graph neural network (GNN) is an artificial neural network that applies transformations on graph data. GNN transformations maintain the connection relationships between nodes on a graph, but can strengthen or weaken the connections according to a task-specific optimization.

Prediction component 235 predicts compatibility between items, as well as the shared attribute between compatible items. Embodiments of prediction component 235 include a decoder and an ANN configured to decode and parse vector representations generated by embedding component 230.

According to some aspects, prediction component 235 is configured to identify a second product that is compatible with the first product. According to some aspects, prediction component 235 queries a database that includes available products to identify the second product from the subset of available products based on a shared attribute, where the second product is identified based on a knowledge graph that includes a first node representing the first product and a second node representing the second product. In some examples, prediction component 235 determines that a third product is not compatible with the first product based on the knowledge graph and the shared attribute. In some examples, prediction component 235 computes a similarity score between the first vector representation and the second vector representation, where the second product is identified based on the similarity score. Prediction component 235 is an example of, or includes aspects of, the corresponding element described with reference to FIGS. 3, 7, and 10.

Generative model 240 generates information about items based on the items' embeddings provided by embedding component 230. Some examples of generative model 240 include a generative language model which is trained to generate additional text using the embedding. Additional text may be used to generate or augment titles and descriptions of items. Generative model 240 is an example of, or includes aspects of, the corresponding element described with reference to FIG. 3.

According to some aspects, generative model 240 generates listing content for a first product based on the knowledge graph, where the listing content indicates compatibility of the first product with the subset of available products based on the attribute. In some examples, generative model 240 generates a predicted product description for the product. In some aspects, the listing content includes a product bundle promotion, where the product bundle promotion includes a set of products that are compatible with the first product.

Training component 255 adjusts parameters of natural language processing component 220, embedding component 230, prediction component 235, and generative model 240. In some embodiments, the above-referenced components are trained in multiple training phases. For example, the above-referenced components may be trained in a first phase before inference time, and trained or updated again at inference time or after inference time. In at least one embodiment, training component 255 is provided by another apparatus different from item compatibility apparatus 200.

According to some aspects, training component 245 compares predicted annotations generated by natural language processing component 220 to ground-truth annotations. In some examples, training component 245 updates parameters of natural language processing component 220 based on the comparison. In some examples, training component 245 compares predicted vector representations generated by embedding component 230 to ground-truth vector representations. In some examples, training component 245 updates parameters of embedding component 230 based on the comparison.

In some examples, training component 245 compares an identified subset of available products (corresponding to items that are compatible with a first item) from unstructured product data with the set of compatible products from structured product data. In some examples, training component 245 updates parameters of prediction component 235 based on the comparison. In some examples, training component 245 compares a predicted product description generated by generative model 240 to a ground-truth product description. In some examples, training component 245 updates parameters of generative model 240 based on the comparison.

Figure 3:
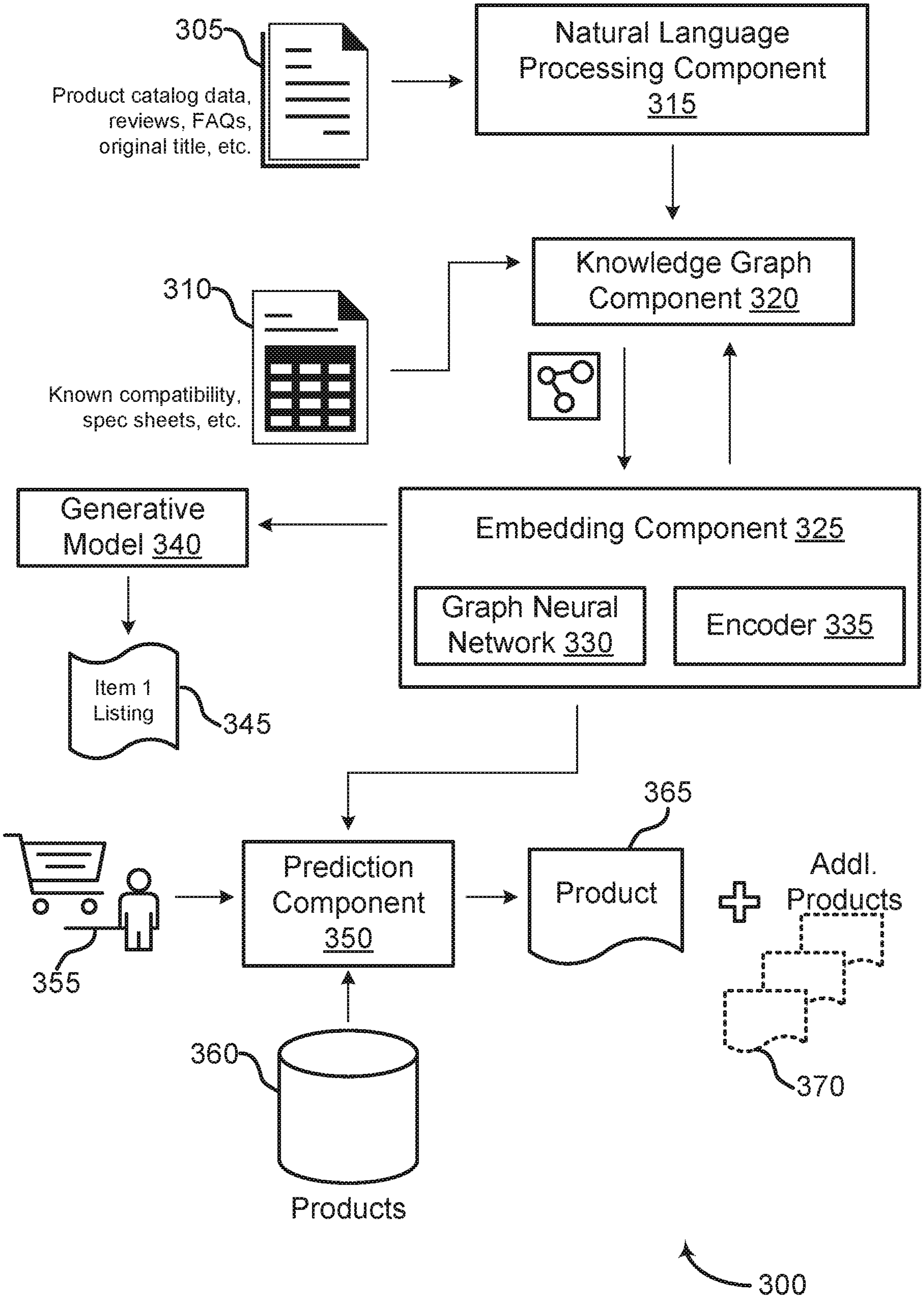
FIG. 3 shows an example of a pipeline for generating item listings and predicting compatible items according to aspects of the present disclosure.

FIG. 3 shows an example of a pipeline for generating item listings 345 and predicting compatible items (e.g., compatible product 365, and compatible products bundle 370) according to aspects of the present disclosure. The example shown includes compatibility pipeline 300, unstructured data 305, structured data 310, natural language processing component 315, knowledge graph component 320, embedding component 325, generative model 340, item listing 345, prediction component 350, user interaction history 355, product database 360, compatible product 365, and compatible products bundle 370.

Unstructured data 305 is an example of, or includes aspects of, unstructured data as described with reference to FIG. 7, as well as aspects of product catalog data and additional unstructured data as described with reference to FIG. 10. Structured data 310 is an example of, or includes aspects of, the corresponding element described with reference to FIGS. 7 and 10. Natural language processing component 315, knowledge graph component 320, embedding component 325, generative model 340, and prediction component 350 are examples of, or includes aspects of, the corresponding elements described with reference to FIG. 2.

User interaction history 355 is an example of, or includes aspects of, the corresponding element described with reference to FIG. 7. Compatible product 365 is an example of, or includes aspects of, the corresponding element described with reference to FIG. 7. Compatible products bundle 370 is an example of, or includes aspects of, the corresponding element described with reference to FIGS. 7 and 10.

In this example, unstructured data 305 is provided to natural language processing component 315. Unstructured data 305 may include but is not limited to product catalog data, reviews, FAQs information, title information, and similar. Natural language processing component 315 performs NLP operations on unstructured data 305, such as named entity recognition (NER). The NER operations may label entities (e.g., "entity resolution") in the data to extract pairs of compatible products and identify shared attributes. Information retrieval from catalogs can extract compatibility relationships between products in the absence of compatibility databases. For example, mentions of other products in an item description can indicate compatibility. In some examples, an item containing mentions of other products can be considered complementary part and products mentioned in the item can be considered hero parts. Entity resolution approaches can be used to extract compatibility relationships and the knowledge can be used to update product compatibility knowledge graphs. A similar entity resolution approach can be applied to product reviews containing mentions of other products that occur with keywords. Some examples of keywords include "fits," "works with," and the like, and may be determined according to the attribute they are describing. In some examples, the keywords can indicate compatibility, and knowledge graph component 320 may update the knowledge graphs based on this indication.

According to an embodiment of the present disclosure, product knowledge graphs enriched with data from structured data 310 (e.g., compatibility databases) can link together products based on compatibility. These knowledge graphs can be used in developing product embeddings that encode compatibility information.

In one aspect, embedding component 325 includes graph neural network 330 and encoder 335. Encoder 335 encodes items and attributes into vector representations that incorporate interconnectivity information. For example, a vector representation for a first item may include a connection to a first attribute, with a connection edge "has_first_attribute," and a connection to a second item that shares the first attribute, with a connection edge "is_compatible" or similar. In cases where the compatibility is based on unstructured data 305, the edge may be encoded as an inferred edge with a predicted compatibility score. In some cases, predicted compatibility between two items is computed based on a similarity score between each encoding of the two items.

Graph neural network 330 is a GNN which updates the embeddings generated by encoder 335. Graph neural network 330 may update embeddings based on new data, or according to learned parameters. The updating operations may result in embeddings which provide predicted item listing content and predicted compatibility with increased accuracy.

Generative model 340 may be used by merchants to generate item listing content such as item listing 345. Item listing content may include generated or augmented (e.g., adjusted or appended) title content and description content. The generation operation may be based on embeddings produced by embedding component 325. For example, generative model 340 may include a component to decode the embeddings and extract interconnectivity information, and may further include a generative language model such as a trained GPT-3 model to generate the listing content based on the extracted information.

Prediction component 350 generates predicted compatibility between products, as well as the shared attribute between the compatible products. In some cases, prediction component 350 receives user interaction history 355 which includes an item, and prediction component 350 identifies an embedding produced by embedding component 325 that corresponds to the item. Then, prediction component 350 may decode or parse the embedding to extract interconnectivity relationships, and generate compatible product 365, and optionally compatible products bundle 370 which contains additional compatible products. In some cases, prediction component 350 queries product database 360 during this process; for example, to ensure that the identified compatible products are currently in stock on the merchant platform.

Figure 4:
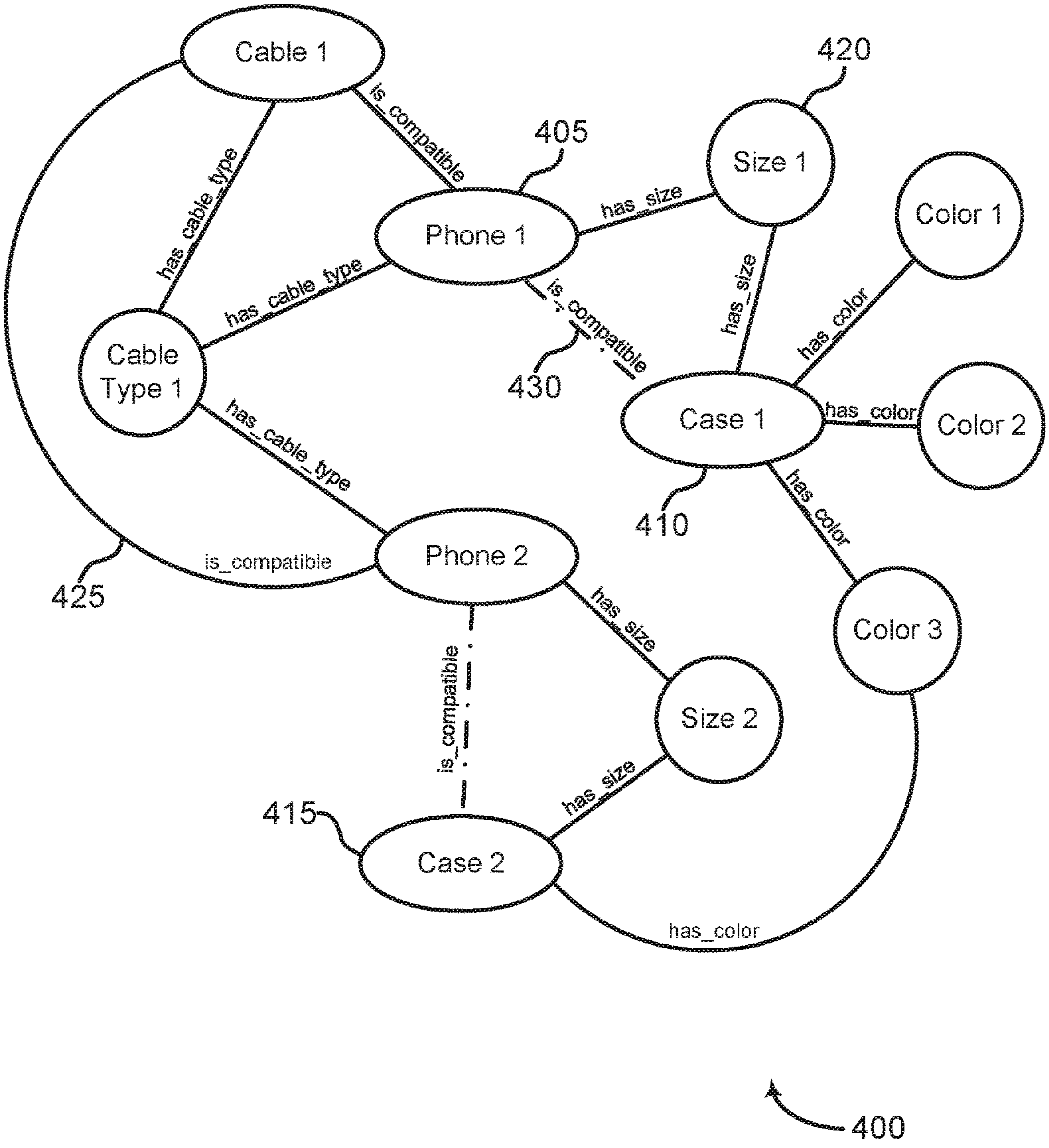
FIG. 4 shows an example of a knowledge graph according to aspects of the present disclosure.

FIG. 4 shows an example of a knowledge graph according to aspects of the present disclosure. The example shown includes knowledge graph 400, first product 405, second product 410, third product 415, attribute 420, edge 425, and predicted edge 430.

In this example, items are represented by oblong ellipse-shaped nodes, and attributes are represented by circular nodes. Labeled edges, e.g., edge 425 and predicted 430, represent relationships between items and items and relationships between items and attributes. In some embodiments, edges are inferred based on other relationships in the knowledge graph. The inferred edges, such as predicted edge 430, may be associated with a compatibility score which represents a confidence level of the predicted compatibility. In some embodiments, inferred edges, such as predicted edge 430, are based on a similarity score between node embeddings. In some examples, the information contained in the knowledge graph may be stored in the form of one or more matrices. For example, an item compatibility apparatus according to the present disclosure may store all the information of the knowledge graph in one or more matrices, and may be configured to present the knowledge graph in a graphical user interface (GUI) to a merchant. In some cases, the merchant may edit the knowledge graph using the GUI, and changes to the knowledge graph may be saved by adjusting the one or more matrices.

As described above, an item which indicates other compatible items in its listing may be referred to as a complementary part, while the indicated items may be referred to as hero parts. For example, second product 410 ("Case 1") may list first product 405 ("Phone 1") as a compatible item. In this example, Case 1 is the complementary part, and Phone 1 is the hero part.

In this example, both first product 405 and second product 410 are connected to attribute 420. Since both first product 405 and second product 410 are connected with the same type of relationship "has_size", knowledge graph 400 may generate or infer a compatibility between first product 405 and second product 410. This inferred compatibility is represented by predicted edge 430.

Compatibility may also be extracted (e.g., not inferred) from structured data. For example, edge 425 indicates a known compatibility between "Phone 2" and "Cable 1". Edge 425 may be created when the item compatibility apparatus extracts relationships from a compatibility database including "Cable 1".

Predicting Compatible Products

A method for inferring compatibility relationships is described. One or more aspects of the method include identifying user interaction history including an interaction between a user and a first product, wherein the first product comprises an attribute that is compatible with a subset of available products; querying a database that includes the available products to identify a second product from the subset of available products based on the attribute, wherein the second product is identified based on a knowledge graph that includes a first node representing the first product and a second node representing the second product; and providing a customized user experience for the user that indicates the second product and the attribute.

Some examples of the method, apparatus, non-transitory computer readable medium, and system further include identifying an additional interaction between the user and a third product. Some examples further include determining that the third product is not compatible with the first product based on the knowledge graph and the attribute. Some examples further include providing an alert to the user that the third product is not compatible with the first product based on the determination.

Some examples further include receiving unstructured product data about the first product. Some examples further include performing natural language processing on the unstructured product data to identify the first product and the attribute. Some examples further include generating the knowledge graph based on the natural language processing. Some examples further include generating the first node, the second node, and an edge between the first node and the second node based on the natural language processing, wherein the edge indicates compatibility of the first product and the second product. In some examples, the edge indicates the first product has the attribute.

Some examples of the method, apparatus, non-transitory computer readable medium, and system further include generating a first vector representation of the first product, wherein the first node corresponds to the first vector representation. Some examples further include generating a second vector representation of the second product, wherein the second node corresponds to the second vector representation. Some examples further include computing a similarity score between the first vector representation and the second vector representation, wherein the second product is identified based on the similarity score. Some examples of the method, apparatus, non-transitory computer readable medium, and system further include updating the first vector representation using a graph neural network based on the knowledge graph.

Figure 5:
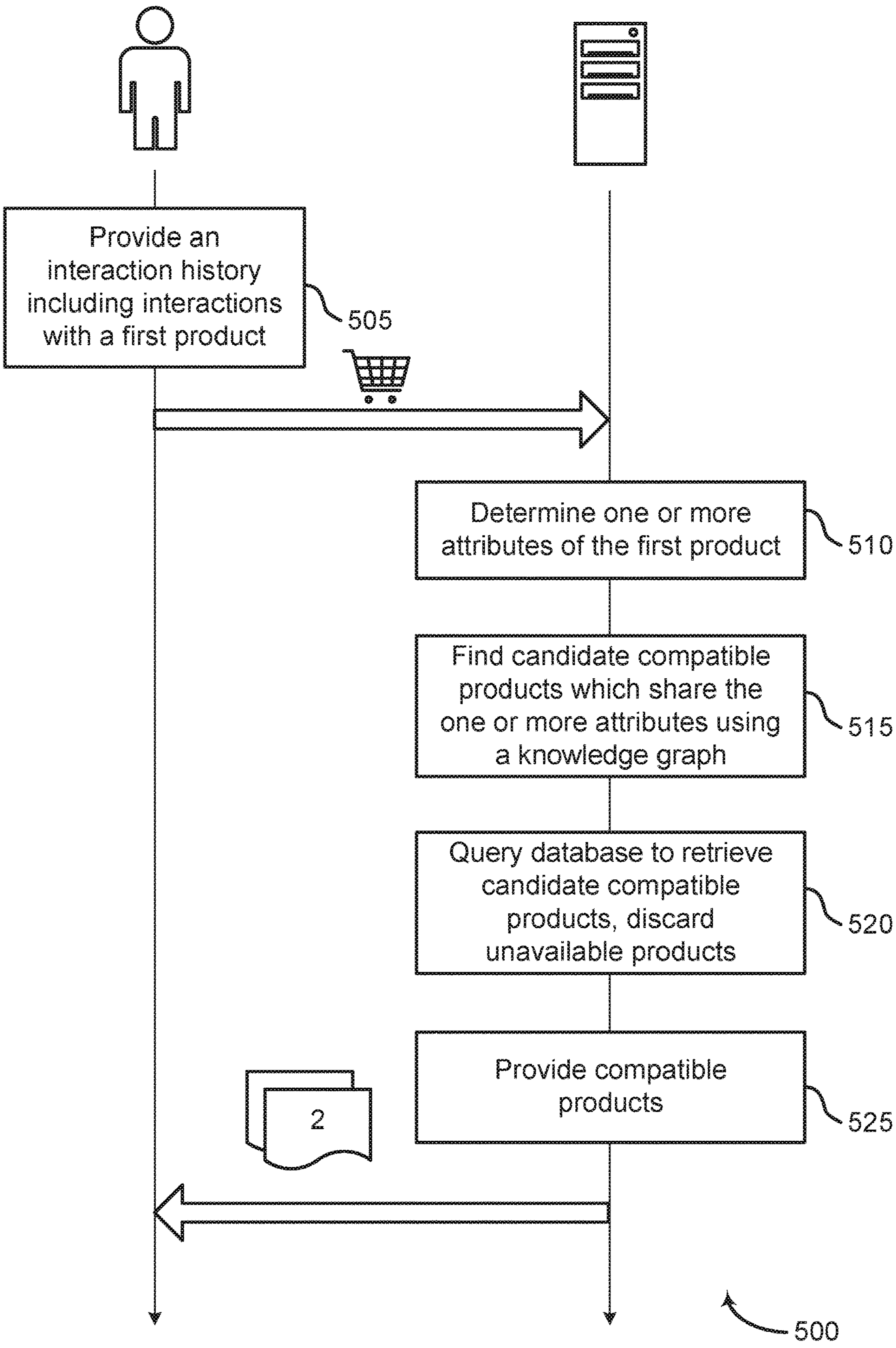
FIG. 5 shows an example of a method for providing compatible products to a user according to aspects of the present disclosure.

FIG. 5 shows an example of a method 500 for providing compatible products to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, a user provides an interaction history including interactions with a first product. The interaction history can include information about the user's current shopping session, and may include information about previous purchases, page visits, and the like.

At operation 510, the system determines one or more attributes of the first product. In some cases, this operation includes identifying one or more vector representations (i.e., embeddings) corresponding to the first product in the interaction history. The system may then decode the embedding to extract relationships between the item and the one or more attributes.

At operation 515, the system finds candidate compatible products which share the one or more attributes using a knowledge graph. For example, information from the knowledge graph may be included in the one or more vector representations, and this information may include compatibility relationships between the first product and the candidate compatible products.

At operation 520, the system queries a database to retrieve candidate compatible products and discard unavailable products. In some cases, the candidate compatible products may include products that are predicted to be compatible with the first product. In some cases, the prediction is based on the first product's and the candidate compatible products' connections to shared attribute(s). In some examples, the prediction is based on a computed similarity score between a vector representation of the first product and vector representations of the candidate compatible products. In at least one example, one or more candidate compatible products are removed from consideration based on the computed similarity score.

At operation 525, the system provides compatible products. For example, the system may provide compatible products through a user interface such as a web-page or GUI. In one example, the system suggests products with known compatibility in one portion of the user interface, and suggests products with predicted compatibility in another portion of the user interface. In some cases, the system suggests a bundle of products that include a plurality of compatible products.

Figure 6:
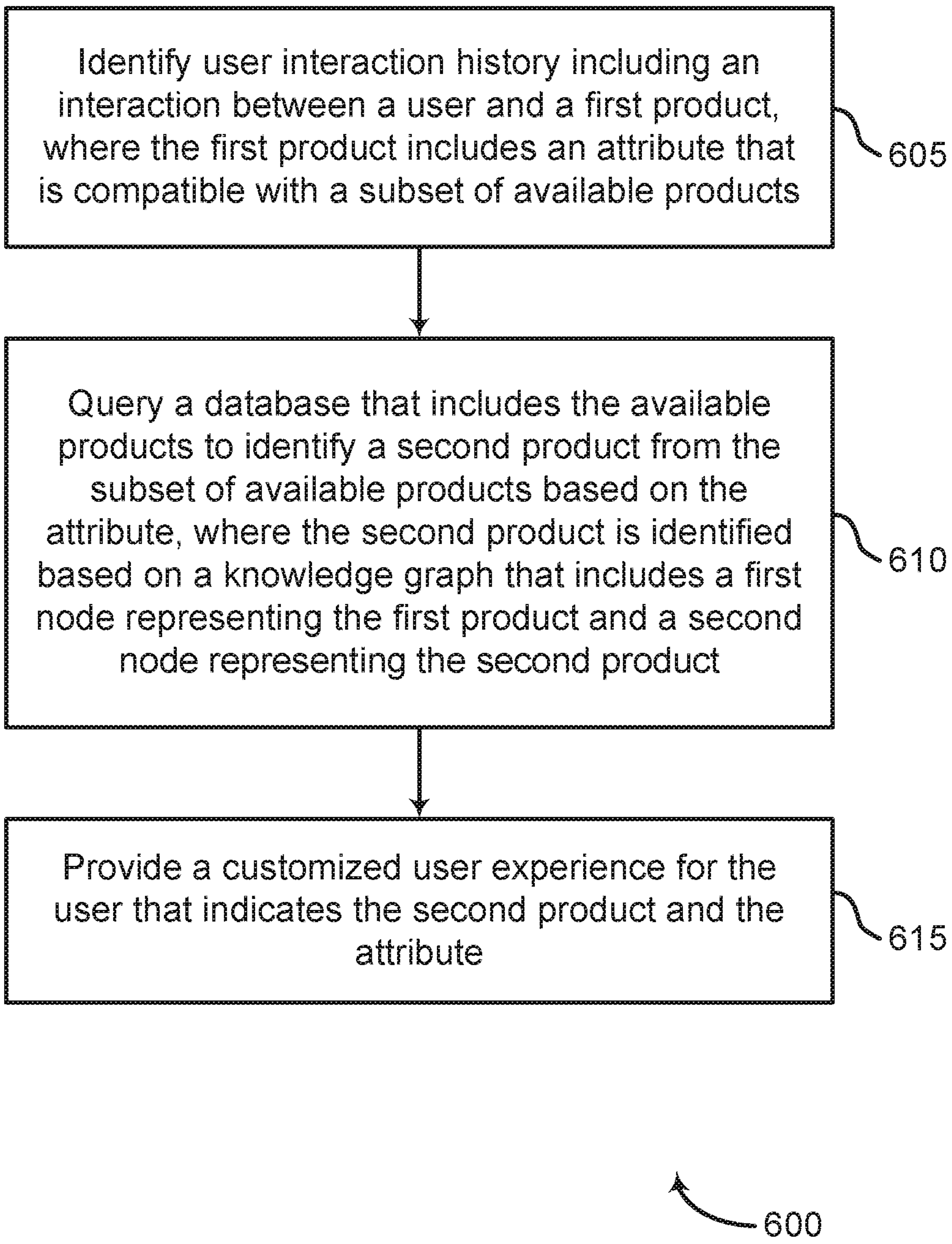
FIG. 6 shows an example of a method for providing a customized user experience according to aspects of the present disclosure.

FIG. 6 shows an example of a method 600 for providing a customized user experience according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system identifies user interaction history including an interaction between a user and a first product, where the first product includes an attribute that is compatible with a subset of available products. In some cases, the operations of this step refer to, or may be performed by, an item compatibility apparatus as described with reference to FIGS. 1 and 2.

At operation 610, the system queries a database that includes the available products to identify a second product from the subset of available products based on the attribute, where the second product is identified based on a knowledge graph that includes a first node representing the first product and a second node representing the second product. In some cases, the operations of this step refer to, or may be performed by, a prediction component as described with reference to FIGS. 2, 3, 7, and 10. In an example, this operation includes referencing an embedding in the database corresponding to the first product. The embedding may include information about the first product's relationship to one or more attributes.

At operation 615, the system provides a customized user experience for the user that indicates the second product and the attribute. In some cases, the operations of this step refer to, or may be performed by, a user interface as described with reference to FIG. 2. For example, the user interface may include a graphical user interface, and may be a part of a web-page or mobile app. In some cases, the customized user experience includes prompts for the user to search for additional products based on the attribute.

Figure 7:
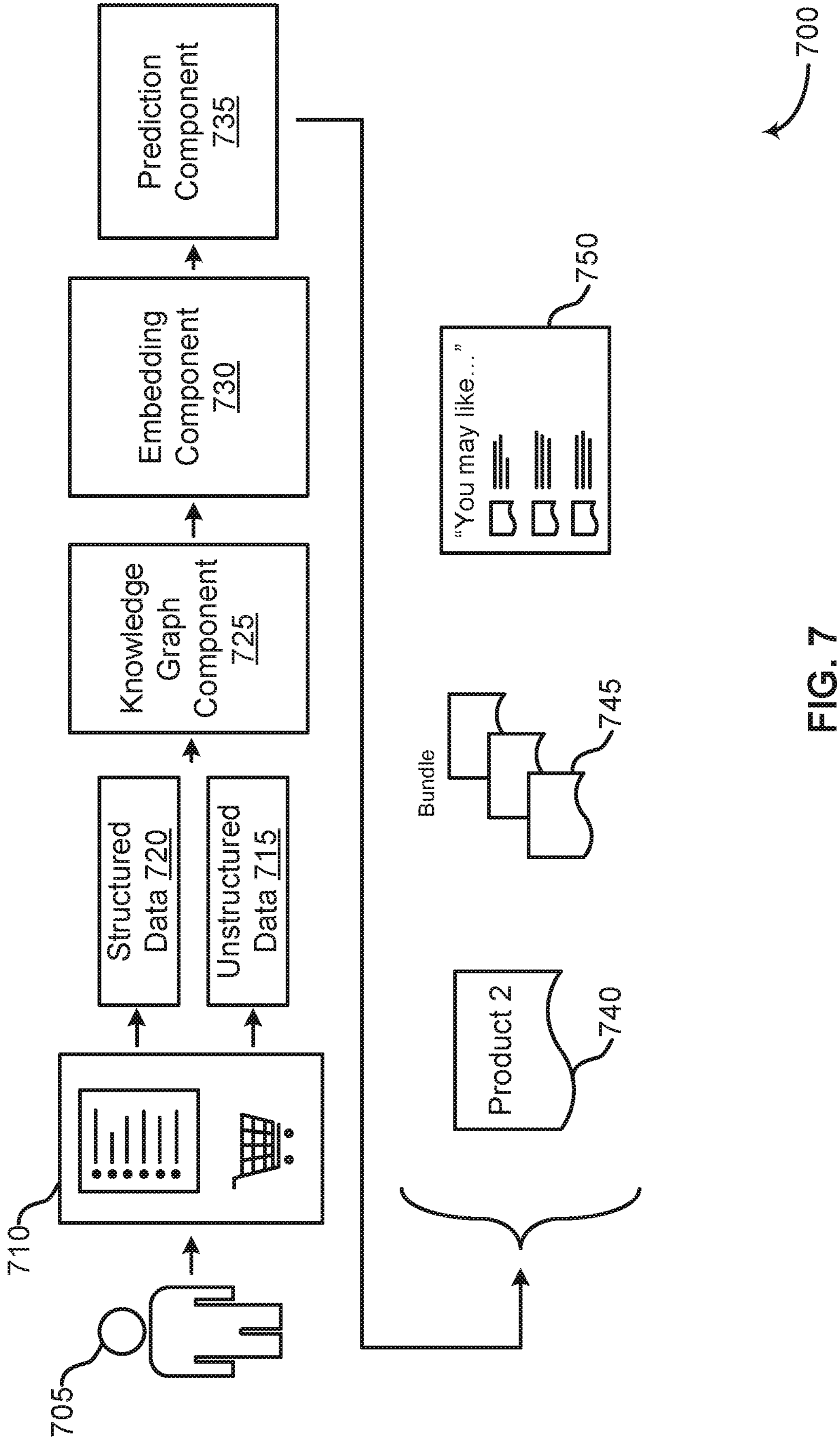
FIG. 7 shows an example of a customized user shopping experience according to aspects of the present disclosure.

FIG. 7 shows an example of a customized user shopping experience 700 according to aspects of the present disclosure. The example shown includes customized user shopping experience 700, user 705, user interaction history 710, unstructured data 715, structured data 720, knowledge graph component 725, embedding component 730, prediction component 735, compatible product 740, compatible products bundle 745, and suggested items 750.

In this example, user 705 provides user interaction history 710 to the system. User 705 (e.g., a shopper) may provide user interaction history 710 through, for example, a user interface of the system. When the system has identified a first product from user interaction history 710, the system may identify unstructured data 715 about the first product from the product's current listing, as well as reviews of the first product, and the like. The system may additionally identify structured data 720 about the product from, for example, a compatibility database on a merchant platform.

In some cases, the system references an existing knowledge graph generated by knowledge graph component 725. In some cases, the system initializes a knowledge graph that includes the first component based on unstructured data 715 and structured data 720 according to the processes described with reference to at least FIGS. 3 and 4.

Embedding component 730 may optionally generate a vector representation of the first product that includes connection relationships between the first product and one or more attributes, and between the first product and other products. In some cases, embedding component 730 is used to identify an existing embedding corresponding to the first product. In some embodiments, embedding component 730 includes a graph neural network configured to update or optimize the vector representation of the first product based on new information.

Prediction component 735 may include a decoder, and is configured to generate predictions of products that are compatible with the first product. Prediction component 735 may generate compatible product 740, compatible products bundle 745, and suggested items 750. In some cases, compatible product 740 and compatible products bundle 745 include products that have a known compatibility, or a compatibility with a high confidence. In some cases, suggested items 750 may correspond to products that have an inferred compatibility with the first product, but do not meet a threshold for predicted compatibility.

User interaction history 710 is an example of, or includes aspects of, the corresponding element described with reference to FIG. 3. Unstructured data 715 is an example of, or includes aspects of, the corresponding element described with reference to FIG. 3. Structured data 720 is an example of, or includes aspects of, the corresponding element described with reference to FIGS. 3 and 10.

Knowledge graph component 725 is an example of, or includes aspects of, the corresponding element described with reference to FIGS. 2, 3, and 10. Embedding component

730 is an example of, or includes aspects of, the corresponding element described with reference to FIGS. 2, 3, and 10. Prediction component 735 is an example of, or includes aspects of, the corresponding element described with reference to FIGS. 2, 3, and 10.

Compatible product 740 is an example of, or includes aspects of, the corresponding element described with reference to FIG. 3. Compatible products bundle 745 is an example of, or includes aspects of, the corresponding element described with reference to FIGS. 3 and 10.

Some embodiments of the item compatibility apparatus recommend complementary parts to a shopper when a hero part does not have a corresponding complementary part in the cart or in recent purchase history. As a result, the item compatibility apparatus provides the user with a highly-personalized experience based on the recommendation.

In some embodiments, the item compatibility apparatus performs a compatibility check with existing products in the cart and the purchase history of the user for a complementary part added to the cart. The item compatibility apparatus may display a list of products the user has previously purchased that are compatible with the item in their cart, which can reaffirm the user of the decision to buy the item. In some cases when no compatible products are found, the model provides the user with alternate complementary part suggestions. Compatible product bundles and promotions offered to shoppers can lead to increased product awareness and an increase of complementary products that may not have high conversions.

Cataloguing Products and Compatibility Relationships

A method for inferring compatibility relationships is described. One or more aspects of the method include receiving unstructured product data about a first product; performing natural language processing on the unstructured product data to identify the first product and an attribute that indicates compatibility of the first product with a subset of available products; generating a knowledge graph that represents the first product and the attribute; and generating listing content for the first product based on the knowledge graph, wherein the listing content indicates compatibility of the first product with the subset of available products based on the attribute. Some examples further include generating a first node, a second node, and an edge between the first node and the second node based on the natural language processing, wherein the edge indicates compatibility of the first product and the second product, and wherein the knowledge graph includes the first node, the second node, and the edge. In some aspects, the listing content includes a product bundle promotion, wherein the product bundle promotion comprises a plurality of products that are compatible with the first product.

The methods described herein may be implemented by one or more components that correspond to functional blocks of an item compatibility apparatus. The components may be implemented in separate circuits, or may be implemented by a general-purpose processor configured to execute instructions corresponding to the components. In some embodiments, the components include trainable ANNs, and the instructions include parameters that are learned in a training phase.

Some examples of the method, apparatus, non-transitory computer readable medium, and system further include receiving ground-truth named entity recognition (NER) data, wherein the ground-truth NER data comprises unstructured text and ground-truth annotations. Some examples further include performing, using a natural language processing component, natural language processing on the unstructured text to generate predicted annotations. Some examples further include comparing the predicted annotations to the ground-truth annotations. Some examples further include updating parameters of the natural language processing component based on the comparison.

Some examples further include receiving ground-truth embedding data, wherein the ground-truth embedding data comprises ground-truth vector representations. Some examples further include generating, using an embedding component, predicted vector representations of the products and attributes. Some examples further include comparing the predicted vector representations to the ground-truth vector representations. Some examples further include updating parameters of the embedding component based on the comparison.

Some examples of the method, apparatus, non-transitory computer readable medium, and system further include receiving structured product data about a first product, a compatibility attribute, and a plurality of compatible products. Some examples further include comparing the identified subset of available products from the unstructured product data with the plurality of compatible products from the structured product data. Some examples further include updating parameters of a prediction component based on the comparison.

Some examples of the method, apparatus, non-transitory computer readable medium, and system further include receiving ground-truth listing data including a product, a plurality of compatibility attributes, and a ground-truth product description. Some examples further include generating, using a generative model seeded with inferred compatibility information about the product, a predicted product description for the product. Some examples further include comparing the predicted product description to the ground-truth product description. Some examples further include updating parameters of the generative model based on the comparison.

In some cases, merchants create new product listings and modify existing product listings to incorporate product compatibility information. However, incorporation of product compatibility information can be labor intensive depending on the level of automation in product listing workflows, existence of integrations with compatibility databases, and the size of catalogs.

To address this, embodiments supplement the manual process of keying in model numbers or keywords to search for compatible products in large databases by providing compatible product suggestions for a product listing. For example, the item compatibility apparatus of the present disclosure learns product embeddings from the knowledge graph, and provides suggestions that are ranked by a compatibility score for a hero part, such as a phone. As a result, the overhead of product lookups and manual comparison of product descriptions is significantly reduced which improves the experience of product listing creation for merchants.

In some cases, merchants may include attribute mentions of hero parts in a product listing for providing compatibility information to shoppers. The item compatibility apparatus can learn attribute importance weights from mentions in titles of compatible product pairs and infers attribute importance in unseen product pairs. For example, an embedding component of the item compatibility apparatus may include attention blocks that adjust the weighting of parameters in an embedding corresponding to the mentions of other products in a product listing. The embedding component may, for example, update a knowledge graph according to the learned weights.

In some examples, a generative model uses the embeddings to generate product titles. In some examples, the suggested product titles contain compatible attribute mentions and can reduce manual errors in the product listing process. The generated titles and descriptions from the generative model may reduce the number of purchases of incompatible products, which may reduce poor product ratings or reviews by a shopper due to erroneous purchases from missing compatibility information.

The compatibility information can be incorporated in the product listing workflow in a sequential manner. For example, the system can provide product suggestions to identify compatible products, and then provide suggestions of attributes from the identified compatible product. In some cases, the suggestions and identified products are highlighted in the product listing.

Figure 8:
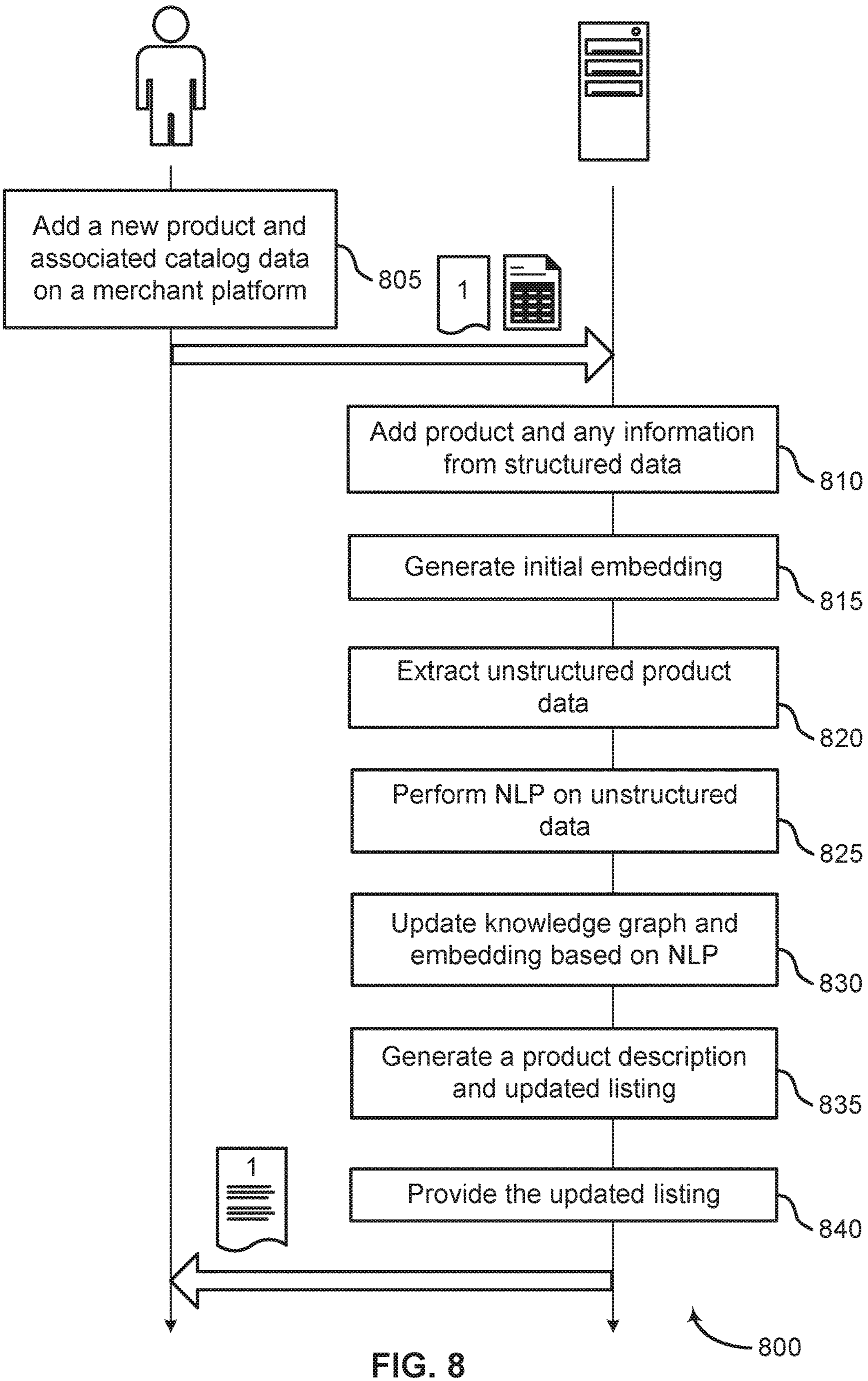
FIG. 8 shows an example of a method for updating a listing according to aspects of the present disclosure.

FIG. 8 shows an example of a method 800 for updating a listing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, a user (e.g., a merchant) adds a new product and associated catalog data on a merchant platform. In some cases, the catalog data is provided by the manufacturer of the product. The merchant may additionally add known compatibility data from, for example, a product database.

At operation 810, the system adds the new product and any attributes from structured data to a knowledge graph. Structured data includes information about known relationships between products and attributes, or between products and other products. Such data may be provided by a manufacturer. This operation may be performed by a knowledge graph component as described with reference to FIGS. 2 and 3. An example of a knowledge graph is provided with reference to FIG. 4.

At operation 815, the system generates an initial embedding for the product based on the knowledge graph. The embedding may be a vector representation that includes interconnectivity information about the new product. This operation may be performed by an embedding component as described with reference to FIGS. 2 and 3.

At operation 820, the system extracts unstructured product data. For example, the unstructured product data may include title and description information from a listing, FAQs, reviews, and similar language data associated with the product.

At operation 825, the system performs natural language processing on the unstructured product data. In some cases, the natural language processing includes NER operations. The NER operations may label entities in the data to extract pairs of compatible products and identify shared attributes. This is referred to as an "entity resolution" approach.

At operation 830, the system updates the knowledge graph and the embedding based on the natural language processing. This may be performed by a graph neural network of the embedding component as described with reference to FIG. 3.

At operation 835, the system generates a product description and updated listing based on the updated embedding. This operation may be performed by a generative model as described with reference to FIG. 3. At operation 840, the system provides the updated listing. For example, the system may display the listing in a graphical user interface (GUI), in a web-page, in a form of message to the user, or the like.

Figure 9:
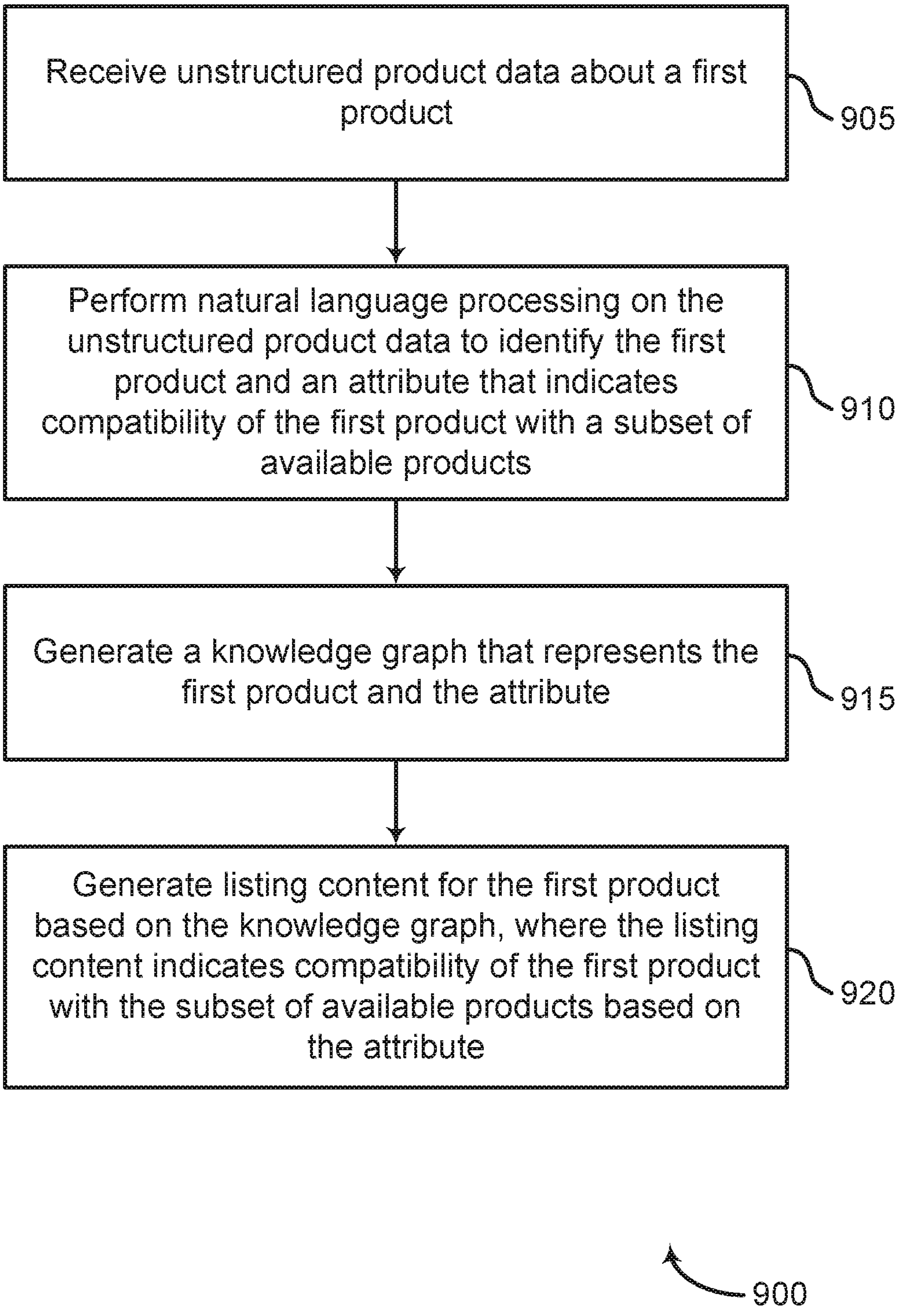
FIG. 9 shows an example of a method for generating a product description according to aspects of the present disclosure.

FIG. 9 shows an example of a method 900 for generating a product description according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives unstructured product data about a first product. In some cases, the operations of this step refer to, or may be performed by, an item compatibility apparatus as described with reference to FIGS. 1 and 2. For additional examples and information about unstructured product data, refer to FIGS. 3 and 8.

At operation 910, the system performs natural language processing on the unstructured product data to identify the first product and an attribute that indicates compatibility of the first product with a subset of available products. In some cases, the operations of this step refer to, or may be performed by, a natural language processing component as described with reference to FIGS. 2 and 3. In some cases, the natural language processing includes NER operations. The NER operations may label entities in the data to extract pairs of compatible products and identify shared attributes.

At operation 915, the system generates a knowledge graph that represents the first product and the attribute. In some cases, the operations of this step refer to, or may be performed by, a knowledge graph component as described with reference to FIGS. 2, 3, 7, and 10. An example of a knowledge graph is provided with reference to FIG. 4.

At operation 920, the system generates listing content for the first product based on the knowledge graph, where the listing content indicates compatibility of the first product with the subset of available products based on the attribute. In some cases, the operations of this step refer to, or may be performed by, a generative model as described with reference to FIGS. 2 and 3. The generative model may use an embedding corresponding to the first product in the generation process. In some examples, the listing content includes a new or augmented title, a new or augmented description, or other language content that indicates compatibility of the first product with the subset of available products.

Embodiments of the present disclosure include an item compatibility apparatus configured to automatically infer parts compatibility and provide relevant information as a baseline to merchandiser for review. In some examples, the item compatibility apparatus additionally highlights compatibility attributes to the merchandizer for optimization of store pages layout. The item compatibility apparatus may suggest or recommend product description augmentation based on inferred compatibility attributes.

Figure 10:
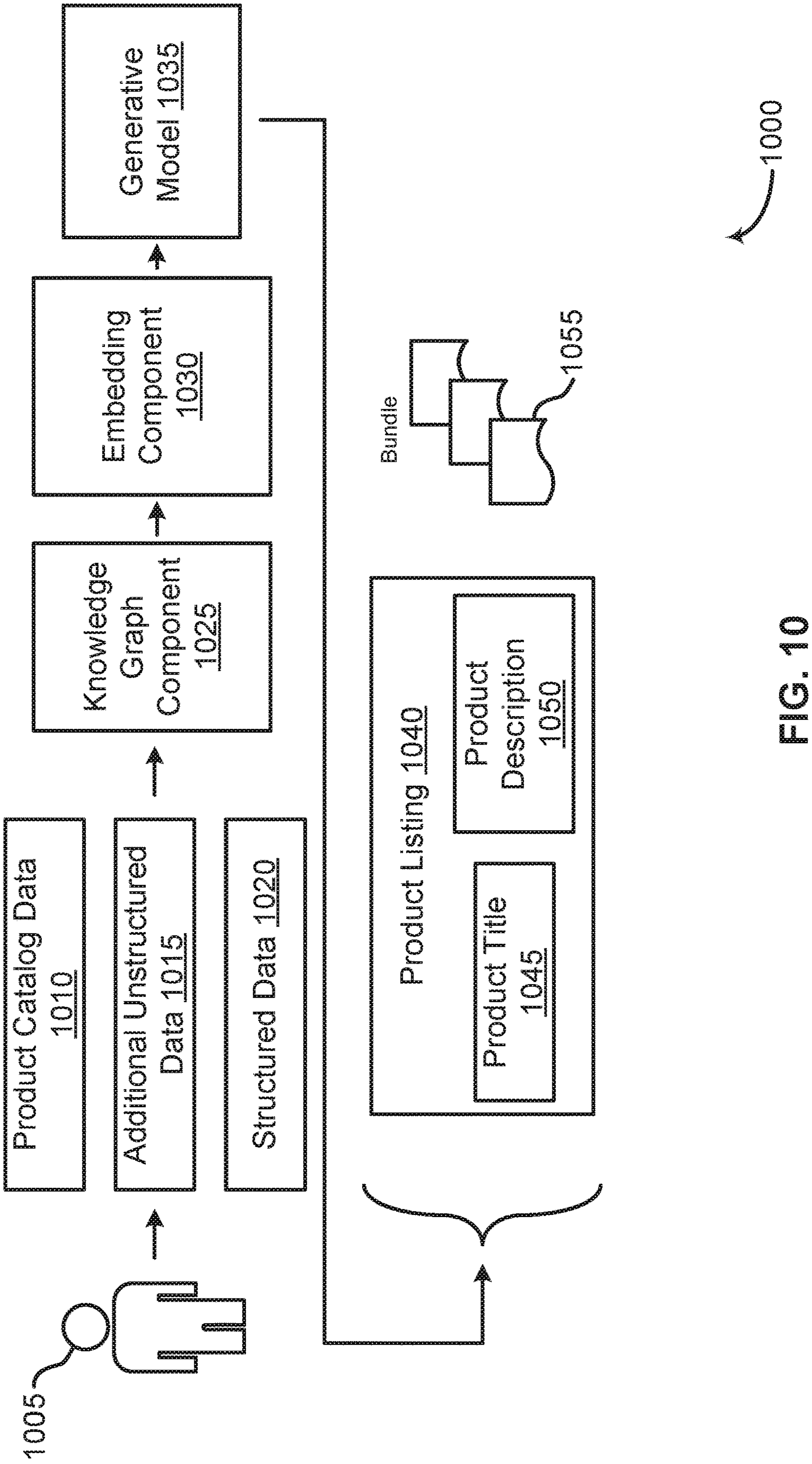
FIG. 10 shows an example of a merchant's experience according to aspects of the present disclosure.

FIG. 10 shows an example of a merchant's experience according to aspects of the present disclosure. The example shown includes merchant experience 1000, user 1005, product catalog data 1010, additional unstructured data 1015, structured data 1020, knowledge graph component 1025, embedding component 1030, generative model 1035, product listing 1040, and compatible products bundle 1055.

Structured data 1020 is an example of, or includes aspects of, the corresponding element described with reference to FIGS. 3 and 7. Knowledge graph component 1025 is an example of, or includes aspects of, the corresponding element described with reference to FIGS. 2, 3, and 7. Embedding component 1030 is an example of, or includes aspects of, the corresponding element described with reference to FIGS. 2, 3, and 7. Generative model 1035 is an example of, or includes aspects of, the corresponding element described with reference to FIGS. 2 and 3.

While FIG. 7 illustrates an example of a shopper's experience with an item compatibility apparatus of the present disclosure, FIG. 10 illustrates an example of a merchant's experience with the item compatibility apparatus. In this example, user 1005 (e.g., a merchant) provides information pertaining to a new product, such as product catalog data 1010 (such as an initial listing description and title), additional unstructured data 1015, and structured data 1020. Additional unstructured data 1015 may contain, for example, product reviews.

Knowledge graph component 1025 processes product catalog data 1010, additional unstructured data 1015, and structured data 1020 to generate or update a knowledge graph containing known and inferred connections between the new product and attributes, as well as between the new product and other products.

Embedding component 1030 generates embeddings for the new product that include the information stored in the knowledge graph. In some aspects, embedding component 1030 includes a graph neural network configured to update the embeddings in response to new information.

Generative model 1035 processes one or more embeddings from embedding component 1030 to generate product listing 1040. For example, generative model 1035 may generate new language content (textual or audio) that includes compatibility information for the new product. In one aspect, product listing 1040 includes product title 1045 and product description 1050. The compatibility information may be inserted into product title 1045, product description 1050, or both. In some examples, generative model 1035 additionally generates listing content for compatible products bundle 1055. In some examples, compatible products bundle 1055 is generated by a prediction component as described with reference to FIGS. 2 and 3. In some cases, user 1005 is prompted to approve or adjust the content generated by generative model 1035.

In some cases, a large list of products may be managed manually for compatibility and parts requirements. For example, such lists may be managed and tracked by domain experts within a manufacturer, lines of products, and merchandise. However, the adaptability of such lists to digital forms may not be seamless for merchants with large businesses. For example, a merchant's customers can be medium to large businesses with special needs of items that are not suitable for individual use, i.e., B2B businesses.

As a result, such merchants can benefit from deploying intelligent product listings that result in an automated approach and a curated list with clear features that determine the compatibility. Additionally, businesses with a B2B line of products can seek customers through ecommerce (i.e., without direct ordering from customers). Thus, the merchant's customer reach and sales increase.

Product compatibility and hero or complementary parts can be tracked within brands and/or product lines. Additionally, cross-brand compatibility of products is performed when products with required parts and corresponding features are listed precisely and are searchable. The cross-brand compatibility results in an enhanced customer experience and product visibility. For example, cross-brand compatibility provides users with a wide range of products with different prices to choose from. In some examples, small businesses that are carriers of compatible parts from alternative manufactures can get opportunities to sell products.

The availability of compatibility information and related features provides for an efficient method of search and query in ecommerce (i.e., store front and merchants front). For example, compatibility information and related features provide merchants with information on user demand and product availability which can be utilized by the merchants to adjust supply and adapt to the market.

Embodiments of the present disclosure include an item compatibility apparatus configured to guide a shopper on an online shopping experience journey. In some cases, the item compatibility apparatus can help the shopper with searching and browsing relevant items. For example, the item compatibility apparatus can highlight attributes impacting compatibility, provide for shoppers to filter items by compatibility attributes, alert shoppers to incompatibilities, and surface compatible items together. In some examples, a shopper can be alerted to incompatibilities based on cart content, previous purchase trends, etc. In some examples, item compatibility apparatus provides compatible items together in form of a recommended bundle or as part of a shopper's specific request. For example, the shopper is enabled to specifically query/search/filter by compatible items. As a result, the item compatibility apparatus minimizes the rate of returns due to incompatible purchases which reduces shopper inconvenience and cost incurred to the merchant due to returns.

The item compatibility apparatus can increase the speed with which shoppers can find desired products. For example, the item compatibility apparatus reduces time for shoppers as a compatibility feature helps shoppers identify appropriate parts for purchase with reduced research. For example, shoppers in large B2B type purchases can find appropriate items in a significantly reduced time. Additionally, item compatibility features provide visibility to compatible products across multiple brands. Thus, shoppers can find similar compatible items for reduced prices and the merchant can promote the item based on compatibility relevance.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:

receiving unstructured product data about a first product;

performing natural language processing on the unstructured product data to identify a compatible product pair including the first product and an available product based on a shared attribute that indicates compatibility for use of the first product with the available product having a different category than the first product according to a knowledge graph schema;

generating a knowledge graph according to the knowledge graph schema, wherein the knowledge graph includes a plurality of nodes including a first node comprising an embedding of the first product, a second node comprising an embedding of the available product, a third node comprising an embedding of the shared attribute, a first edge representing the compatibility of the first product for use with the available product and connecting the first node and the third node, and a second edge connecting the second node and the third node, and wherein each of the plurality of nodes comprises a vector representation of a corresponding product and attributes of the corresponding product;

updating, using a machine learning model comprising a graph neural network, the knowledge graph to obtain an updated knowledge graph by updating the embedding of the first product to obtain an updated vector representation that encodes interconnectivity information indicating the compatibility for use with the available product based on the first edge representing the compatibility of the first product for use with the available product, wherein the machine learning model is trained using training data including compatible product pairs; and generating, using a generative machine learning model, a text description for the first product based on the updated embedding of the first product, wherein the text description indicates compatibility of the first product with the available product based on the shared attribute, and wherein the generative machine learning model is trained by:

receiving ground-truth listing data including a product, a plurality of compatibility attributes, and a ground-truth product description;

generating, using the generative machine learning model, a predicted product description for the product, wherein the generative machine learning model is seeded with inferred compatibility information about the product;

comparing the predicted product description to the ground-truth product description; and updating parameters of the generative machine learning model based on the comparison.

2. The method of claim 1, further comprising:

generating a third edge between the first node and the second node based on the natural language processing, wherein the edge indicates compatibility of the first product and the available product.

3. The method of claim 1, further comprising:

receiving ground-truth named entity recognition (NER) data, wherein the ground-truth NER data comprises unstructured text and ground-truth annotations;

performing natural language processing on the unstructured text to generate predicted annotations; comparing the predicted annotations to the ground-truth annotations; and updating parameters of a natural language processing component based on the comparison.

4. The method of claim 1, further comprising:

receiving ground-truth embedding data, wherein the ground-truth embedding data comprises ground-truth embeddings;

generating, using an embedding component, predicted embeddings of the products and attributes;

comparing the predicted embeddings to the ground-truth vector representations embeddings; and updating parameters of the embedding component based on the comparison.

5. The method of claim 1, further comprising:

receiving structured product data about the first product, a compatibility attribute, and a plurality of compatible products;

comparing, using a training component, a subset of available products from the unstructured product data with the plurality of compatible products from the structured product data; and updating parameters of the graph neural network based on the comparison.

6. The method of claim 1, wherein:

the text description is included in a product bundle listing, wherein the product bundle listing comprises a plurality of products that are compatible with the first product.

7. An apparatus comprising:

a processor;

a memory including instructions executable by the processor, wherein the processor is configured to perform operations comprising:

performing natural language processing on unstructured product data to identify a compatible product pair including a first product and an available product based on a shared attribute that indicates compatibility of the first product for use with the available product having a different category than the first product according to a knowledge graph schema;

generating a knowledge graph according to the knowledge graph schema, wherein the knowledge graph includes a plurality of nodes including a first node comprising an embedding of the first product, a second node comprising an embedding of the available product, a third node comprising an embedding of the shared attribute, a first edge representing the compatibility of the first product for use with the available product and connecting the first node and the third node, and a second edge connecting the second node and the third node, and wherein each of the plurality of nodes comprises a vector representation of a corresponding product and attributes of the corresponding product; and updating, using a machine learning model comprising a graph neural network, the knowledge graph to obtain an updated knowledge graph by updating the embedding of the first product to obtain an updated vector representation that encodes interconnectivity information indicating the compatibility for use with the available product based on the first edge representing the compatibility of the first product for use with the available product, wherein the machine learning model is trained using training data including compatible product pairs; and generating, using a generative machine learning model, a text description for the first product based on the updated embedding of the first product, wherein the text description indicates compatibility of the first product with the available product based on the shared attribute, and wherein the generative machine learning model is trained by:

receiving ground-truth listing data including a product, a plurality of compatibility attributes, and a ground-truth product description;

generating, using the generative machine learning model, a predicted product description for the product, wherein the generative machine learning model is seeded with inferred compatibility information about the product;

comparing the predicted product description to the ground-truth product description; and updating parameters of the generative machine learning model based on the comparison.

8. The apparatus of claim 7, the processing device being further configured to perform operations comprising:

identifying the available product that is compatible with the first product.

9. The apparatus of claim 7, the processing device being further configured to perform operations comprising:

performing named entity recognition (NER) on unstructured text to generate annotations based on the unstructured text.

10. The apparatus of claim 7, further comprising:

a training component configured to update parameters of the machine learning model based on a comparison between inferred compatibility data and ground-truth compatibility data.

11. A non-transitory computer readable medium storing code, the code comprising instructions executable by at least one processor to perform operations comprising:

receiving unstructured product data about a first product;

performing natural language processing on the unstructured product data to identify a compatible product pair including the first product and an available product based on a shared attribute that indicates compatibility for use of the first product with the available product having a different category than the first product according to a knowledge graph schema;

generating a knowledge graph according to the knowledge graph schema, wherein the knowledge graph includes a plurality of nodes including a first node comprising an embedding of the first product, a second node comprising an embedding of the available product, a third node comprising an embedding of the shared attribute, a first edge representing the compatibility of the first product for use with the available product and connecting the first node and the third node, and a second edge connecting the second node and the third node, and wherein each of the plurality of nodes comprises a vector representation of a corresponding product and attributes of the corresponding product;

updating, using a machine learning model comprising a graph neural network, the knowledge graph to obtain an updated knowledge graph by updating the embedding of the first product to obtain an updated vector representation that encodes interconnectivity information indicating the compatibility for use with the available product based on the first edge representing the compatibility of the first product for use with the available product, wherein the machine learning model is trained using training data including compatible product pairs; and generating, using a generative machine learning model, a text description for the first product based on the updated embedding of the first product, wherein the text description indicates compatibility of the first product with the available product based on the shared attribute, and wherein the generative machine learning model is trained by:

receiving ground-truth listing data including a product, a plurality of compatibility attributes, and a ground-truth product description;

generating, using the generative machine learning model, a predicted product description for the product, wherein the generative machine learning model is seeded with inferred compatibility information about the product;

comparing the predicted product description to the ground-truth product description; and updating parameters of the generative machine learning model based on the comparison.

12. The non-transitory computer readable medium of claim 11, the code further comprising instructions executable by the at least one processor to perform operations comprising:

generating a third edge between the first node and the second node based on the natural language processing, wherein the edge indicates compatibility of the first product and the available product.

13. The non-transitory computer readable medium of claim 11, the code further comprising instructions executable by the at least one processor to perform operations comprising:

receiving ground-truth named entity recognition (NER) data, wherein the ground-truth NER data comprises unstructured text and ground-truth annotations;

performing natural language processing on the unstructured text to generate predicted annotations;

comparing the predicted annotations to the ground-truth annotations; and updating parameters of a natural language processing component based on the comparison.

14. The non-transitory computer readable medium of claim 11, the code further comprising instructions executable by the at least one processor to perform operations comprising:

receiving ground-truth embedding data, wherein the ground-truth embedding data comprises ground-truth embeddings;

generating, using an embedding component, predicted embeddings of the products and attributes;

comparing the predicted embeddings to the ground-truth embeddings; and updating parameters of the embedding component based on the comparison.

15. The non-transitory computer readable medium of claim 11, the code further comprising instructions executable by the at least one processor to perform operations comprising:

receiving structured product data about the first product, a compatibility attribute, and a plurality of compatible products;

comparing, using a training component, a subset of available products from the unstructured product data with the plurality of compatible products from the structured product data; and updating parameters of the graph neural network based on the comparison.

16. The non-transitory computer readable medium of claim 11, wherein:

the text description is included in a product bundle listing, wherein the product bundle listing comprises a plurality of products that are compatible with the first product.

* * * * *